March 13, 1956 R. N. JANEWAY 2,737,907
RAILWAY TRUCK
Filed Nov. 7, 1950 3 Sheets-Sheet 1
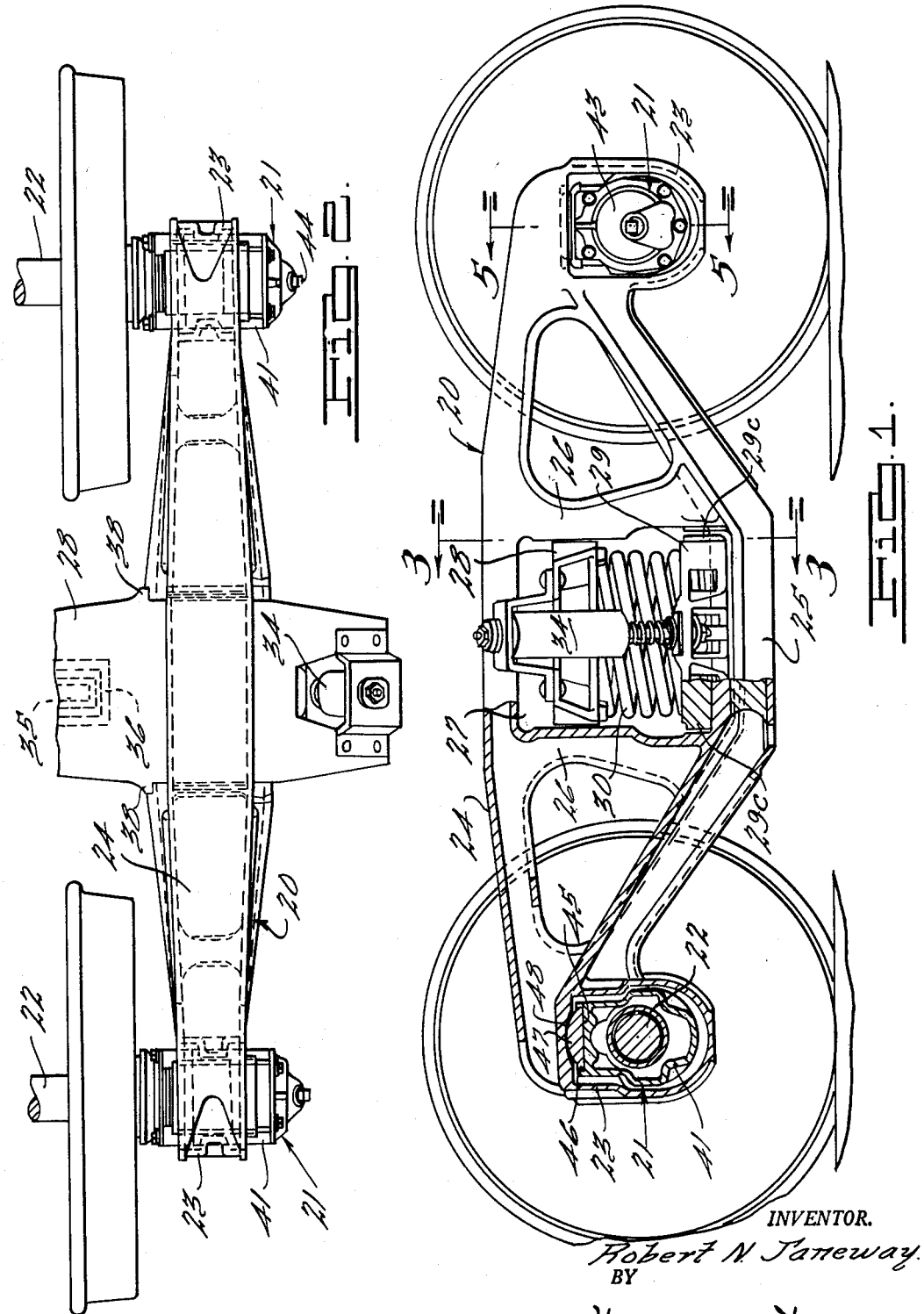
INVENTOR.
Robert N. Janeway.
BY
Harness and Harris
ATTORNEYS.

March 13, 1956  R. N. JANEWAY  2,737,907
RAILWAY TRUCK
Filed Nov. 7, 1950  3 Sheets-Sheet 2
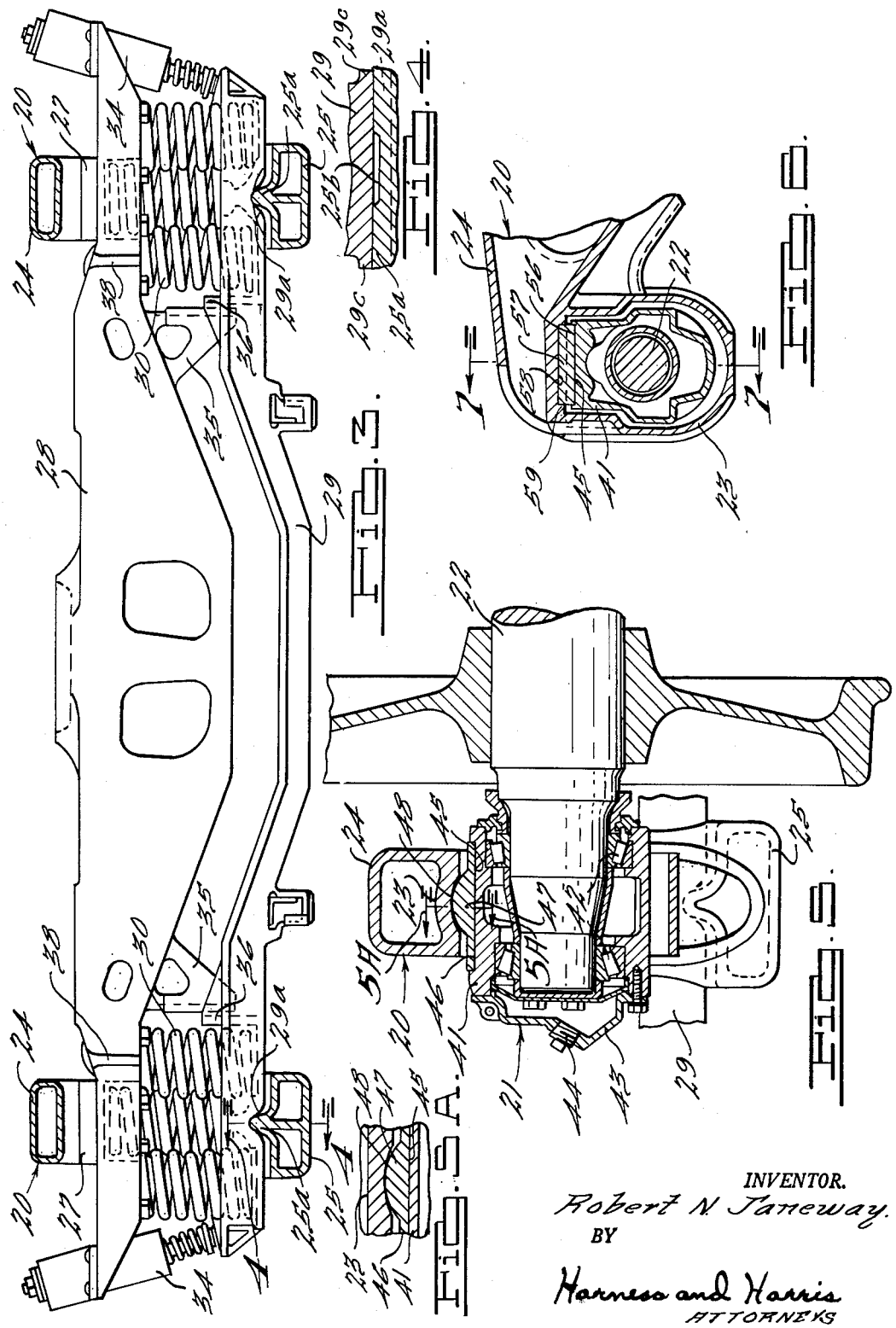
INVENTOR.
Robert N. Janeway.
BY
Harness and Harris
ATTORNEYS March 13, 1956  R. N. JANEWAY  2,737,907
RAILWAY TRUCK
Filed Nov. 7, 1950  3 Sheets-Sheet 3
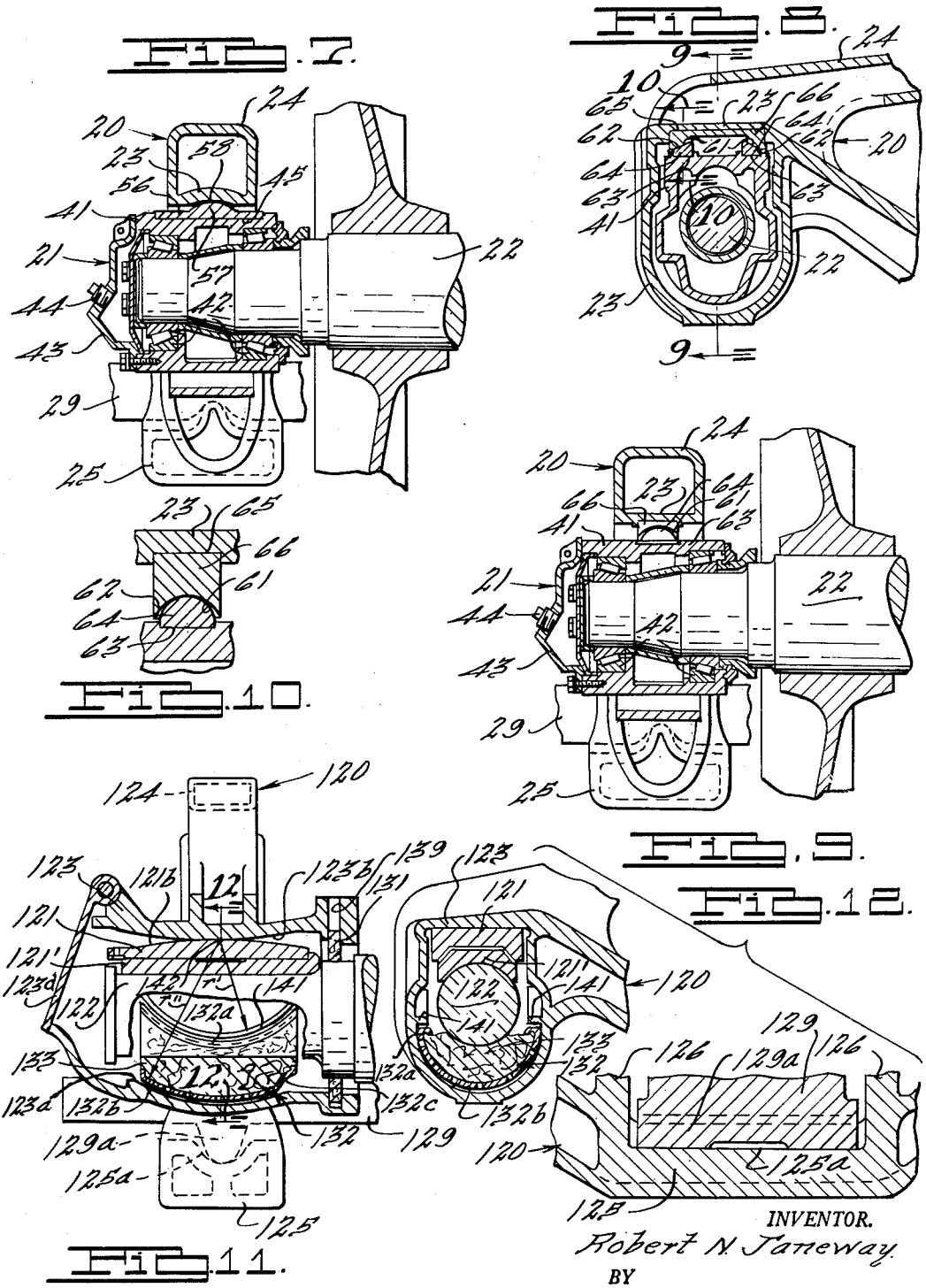
INVENTOR.
Robert N. Janeway
BY
Harness and Harris
ATTORNEYS.

United States Patent Office 2,737,907
Patented Mar. 13, 1956

2,737,907

RAILWAY TRUCK

Robert N. Janeway, Detroit, Mich., assignor to Chrysler Corporation, Highland Park, Mich., a corporation of Delaware Application November 7, 1950, Serial No. 194,508

12 Claims. (Cl. 105—223)

This invention relates to railway truck constructions wherein the spaced truck side frames are supported on the wheel-axle mounted journal bearing assemblies in such a manner that the side frames may function as swing hangers to swingably support a truck load supporting plank member that extends between and is pivotally mounted on the spaced side frames.

While this invention is primarily intended to achieve an improved, low-cost, light weight, railway freight truck construction, still, it will be obvious from the description of the invention set forth below, that the principles herein disclosed may have numerous other applications and thus there is no intention to limit this invention to freight truck constructions alone.

In any railway truck construction there are always the problems of controlling side frame unsquaring and also providing suitable means for controlling the lateral shock loads and forces that may be applied to the truck. Several novel truck constructions, that satisfactorily control both side frame unsquaring and the lateral forces applied to the truck, are disclosed in my co-pending application Serial No. 567,603, filed December 11, 1944, which matured into Patent No. 2,584,880, and in U. S. Patent No. 2,483,858. In the truck constructions disclosed in my aforementioned co-pending application and in the noted patent, the spaced truck side frames, which are more or less rigidly mounted on the wheel-axle journal bearing assemblies, each pivotally support a transversely swingable swing hanger. Mounted on and extending between the spaced swing hangers is a substantially rigid, load supporting, spring plank member. This spring plank member is pivotally supported on the swing hangers in such a manner that side frame unsquaring is effectively restrained while the lateral forces applied to the truck are suitably cushioned and controlled.

The invention herein disclosed is designed to accomplish the same functions and to provide the same improved riding characteristics attained with the above described truck structures without requiring the use of side frame supported swing hangers and their mounting means. By eliminating the swing hangers and their mounting means from the truck assembly, the truck assembly is materially simplified and its weight and cost correspondingly reduced. Furthermore, the construction herein disclosed permits utilization of the same spring plank and bolster unit in this simplified truck assembly as that used in the truck assemblies disclosed in my earlier application and in the noted patent. Thus parts obsolescence may be kept to a minimum in changeovers to the simplified truck construction herein disclosed. Another advantage of this simplified truck assembly is that it lends itself to the use of either the packaged, roller bearing type, wheel-axle mounted, journal bearing assembly or the conventional shell bearing and standard wedge assembly.

It is a primary object of this invention to provide a simplified form of railway truck assembly that has the spaced side frames mounted on the wheel-axle assemblies such that the side frames may function as swing hangers for the side frame supported plank member.

It is another object of this invention to connect the transversely rockable side frames by a plank member in such a manner that side frame unsquaring is restrained and the action of laterally directed forces applied to the truck effectively controlled so as to achieve improved truck riding characteristics.

It is a still further object of this invention to provide novel connecting means between the spaced, transversely rockable, side frames and the plank member connected therebetween.

It is another object of this invention to provide novel pivotal connections between the wheel-axle mounted journal bearing assemblies and the side frames supported thereon such that the side frames may rock transversely of the truck while relative movement longitudinally of the truck between the journal bearing assemblies and the side frames is effectively restrained. The means for resisting the longitudinally directed thrust forces applied to the truck is such that the frictional forces developed therein will not detrimentally affect the transverse pivotal movement of the side frames.

It is still another object of this invention to provide novel wheel-axle mounted journal bearing assemblies having friction means thereon cooperating with complimentary means on the associated side frames to provide controlled rocking movement of the side frames relative to the wheel-axle assemblies.

Other objects and advantages of this invention will become readily apparent from a reading of the description following and a consideration of the related drawings wherein:

Fig. 1 is a side elevation of a railway truck that embodies one form of the invention herein disclosed, portions of the truck assembly being broken away and shown in section;

Fig. 2 is a plan elevation of one side of the railway truck shown in Fig. 1;

Fig. 3 is a transverse sectional elevation taken along the line 3—3 of Fig. 1;

Fig. 4 is a fragmentary sectional elevation taken along the line 4—4 of Fig. 3 disclosing a plank connection to a side frame;

Fig. 5 is an enlarged fragmentary sectional elevation taken along the line 5—5 of Fig. 1 disclosing one form of journal bearing connection to a side frame;

Fig. 5a is a fragmentary sectional elevational view taken along the line 5a—5a of Fig. 5;

Fig. 6 is a fragmentary sectional elevation disclosing a modified form of journal bearing connection to a side frame;

Fig. 7 is a fragmentary sectional elevation taken along the line 7—7 of Fig. 6;

Fig. 8 is a fragmentary sectional elevation of another modified form of journal bearing connection to a side frame;

Fig. 9 is a fragmentary sectional elevation taken along the line 9—9 of Fig. 8;

Fig. 10 is an enlarged, fragmentary, sectional elevational view taken along the line 10—10 of Fig. 8;

Fig. 11 is a fragmentary sectional elevation of another modified form of journal bearing connection to a truck side frame; and Fig. 12 is a fragmentary sectional elevation taken along the line 12—12 of Fig. 11, this view also disclosing portions of a modified truck side frame.

Figs. 1 and 2 show one side of a railway truck that embodies one form of this invention. The truck (see Fig. 3) includes a transversely spaced pair of equalizer members or side frames 20 each of which is supported at each end by means of journal bearing assemblies 21 mounted on the journal portions of the longitudinally spaced pair of wheeled axles 22. Adjacent each end portion, each side frame 20 is formed with a journal box housing 23 to receive an axle journal portion and the associated journal bearing assembly 21. The side frame 20 is of a truss-type construction including an upper box-like, compression member 24, and a lower box-like tension member 25, which members are connected together intermediate their ends by vertically extending column members 26. Column members 26 cooperate with portions of the members 24 and 25 to define a window-like opening 27 through the central portion of the side frame 20. Openings 27 are adapted to receive the end portions of a truck bolster member 28 and an associated spring plank member 29. Bolster member 28 is resiliently supported on the plank member 29 by means of the transversely spaced sets of springs 30. (See Fig. 3.)

Extending transversely across the underside of each end of the plank member 29, in a direction parallel to the length of the side frames 20, is an upwardly arched bearing groove 29a (see Fig. 3). Grooves 29a in the plank member 29 are each adapted to be pivotally mounted on an upwardly projecting, convexly arched, bearing element 25a that projects from the upper side of the lower side frame tension members 25 in the region between the columns 26. Bearings 25a engage the bearing grooves 29a in a manner that permits the side frames to rock relative to the plank 29, about axes extending lengthwise or longitudinally of the side frames and located in the plane of the bearings 25a. However, the engagement of the plank grooves 29a and the side frame bearings 25a is such as to prevent rotation of the plank 29 about a vertically extending axis through the plank and thus the plank 29 will prevent relative longitudinal movement between the spaced side frames 20 and thereby restrain any unsquaring tendencies of the side frames. To insure a maximum resistance to unsquaring at all times the side frame bearings 25a are relieved intermediate their ends as shown at 25b in Fig. 4. This relief of the bearings 25a at their mid-lengths insures engagement of the bearings 25a and grooves 29a adjacent the end portions thereof so that the couples resisting side frame unsquaring will be a maximum. It is obvious that the plank grooves 29a could be relieved at their mid-lengths to accomplish the same result (see Fig. 12) if it was found desirable to have the bearings 25a of uniform height, throughout their length. Such an arrangement is considered the full mechanical equivalent of the construction disclosed in Fig. 4. To further increase the area of gripping engagement between the plank grooves 29a and the side frame bearings 25a, the plank 29 may have transversely extending, grooved ears or lateral extensions 29c formed along the side edges thereof in the regions of the bearing grooves 29a.

Relative vertical movement between the resiliently supported bolster 28 and the plank 29 is controlled by friction type snubber units 34 that are suitably connected between the superimposed ends of the bolster 28 and the plank 29. These snubber units 34 are preferably of the type shown in my co-pending application, Serial No. 145,185, filed Feburary 20, 1950. However, snubber units of other types may be utilized between the plank 29 and bolster 28 without materially affecting the invention herein disclosed.

Relative movement in a direction transverse of the truck between the bolster 28 and plank 29 is limited by the engageable abutment means 35 and 36 that are carried by and project from the bolster 28 and the plank 29 respectively. Abutments 35 and 36 are of substantially U-shaped cross section (see Fig. 2). Members 35 and 36 are arranged in mating relationship and are normally positioned with a clearance therebetween so as to permit a slight amount of relative transverse movement of the truck between the bolster 28 and the plank 29. After a slight amount of this relative transverse movement one or the other sets of abutment means 35, 36 will become engaged and thereafter there will be conjoint movement of the bolster 28 and plank 29 in a direction transversely of the truck.

Relative transverse movement of the bolster 28 with respect to the side frames 20 is limited by the abutment stops 38 that extend from the sides of the bolster 28 adjacent each end thereof. These stops 38 are adapted to engage the inner sides of the frames 20 after the maximum desirable amount of transverse movement of the bolster has taken place. It will be noted that although side frames 20 may swing, still, the area of engagement of frames 20 with bolster stops 38 is at the level of pivot connection of side frames 20 to the journal bearing assemblies 21 and thus this area of the side frames will not move transversely of the truck during their swinging movement.

Figs. 1, 5 and 5a clearly show one of the forms of connection of the journal bearing assemblies to the side frames that permits the side frames 20 to function as swing hangers for the plank member 29. This connection also provides means that resists longitudinal thrusts applied to the truck and relative longitudinal movement between the side frames 20 and the associated journal bearing assemblies 21. The journal bearing assembly 21 that is shown mounted on the axle journal portions at each end of each wheel-axle 22 may be of the packaged, roller bearing type and is of such a construction that it may be easily mounted within the side frame bearing box housing 23. Bearing assembly 21 comprises an outer casing 41 within which is mounted a pair of axially or transversely spaced apart, vertically disposed, roller bearing assemblies 42. Bearing assemblies 42 are rotatably mounted on each end journal portion of an associated wheel axle 22. The outwardly exposed side of the bearing assembly casing 41 is provided with a detachable cover plate 43 that includes a removable plug 44 arranged to provide a means for adding lubricant to the interior of the casing 41 when such addition is necessary. The exterior surface of the upper wall of the bearing assembly casing 41 is provided with a recessed portion 45 in which is seated a side frame bearing block 46. The recessed seat 45 for the bearing block 46 prevents transverse or longitudinal shift of the bearing block 46 relative to the casing 41. The bearing block 46 is provided with an upwardly extending, convexly arched, dome-like, male bearing portion 47 that is of substantially hemi-spheroidal or hemi-ellipsoidal shape. The exposed bearing surface provided by the dome-like bearing portion 47 need not be a true portion of a sphere or ellipsoid for it can be the surface generated by the rotation of any one of a number of curved lines about a vertical axis through the generating line. In the case of the bearing portion 47 it will be noted by a comparison of Figs. 5 and 5a which are drawn to the same scale, that the radius of curvature of the exterior surface of bearing portion 47 in a transversely extending plane (see Fig. 5) is less than the radius of curvature of the exterior surface of the bearing portion 47 in a longitudinally extending plane (see Fig. 5a). The purpose of this variation in radius of curvature in the two aforementioned, normally disposed, planes is to provide a less restricted pivotal movement of the side frames in a plane extending transversely to the side frames than in a plane extending lengthwise of the side frames. The advantages of such an arrangement are subsequently brought out.

The side frame journal box housing 23 has the underside of the upper wall thereof formed with a downwardly directed, concavely arched, dome-like, female bearing surface 48 adapted to receive the convexly arched, dome-like, male bearing portion 47 of the bearing block 46. The curvatures of the bearing surface 48 of the housing 23 are similar to those of the bearing surface of the bearing portion 47 except that the radii of the several curvatures of the surface 48 are slightly larger than those of the mating surface of the bearing portion 47 to permit a limited or initial amount of free rocking movement between these movably engaged bearing elements. After the initial free rocking movement sliding takes place between the engaged bearing surfaces and the friction developed produces a damping effect that controls or resists the pivotal movement of the side frames.

The side frame rocking bearing connection 47, 48 between the bearing assembly 21 and the side frame bearing box housing 23 is one that provides self-restoring angular movement between the side frame 20 and the bearing assembly 21 in a plane extending transversely of the side frames. This bearing connection 47, 48 is also designed such that it will provide sufficient side frame rocking or deflection to take the maximum lateral forces applied thereto prior to engagement of the bolster stops 38 with the inner sides of the side frames 20. It is also thought to be obvious that the bearing connection 47, 48 is one that will take thrust in a direction longitudinally of the truck without creating or providing undue friction that might restrain the self-restoring transverse swinging movement of the side frames 20 relative to their supporting journal bearing assemblies 21. It will also be noted that the angular movement of the journal bearing assemblies 21 relative to the side frames 20, in a plane extending longitudinally of the truck, is of the self-restoring type and this feature is of importance as brought out in my co-pending application, Serial No. 145,481, filed August 21, 1948. The engaged bearing surfaces 47, 48 not only provide friction ramps for control of side frame lateral movement but in addition they provide engaged friction ramp surfaces that resist longitudinal movement of the side frames relative to the axle mounted bearing assemblies without interfering with the side frame lateral pivoting movement.

It will be noted that the pivotal connection of the load supporting plank 29 to the side frame portions 25 is at a level considerably below the level of the side frame rocking connections 47, 48 thus the load applied to the side frames 20 through the plank 29 causes the side frames to function as pendulums whereby a stable condition of equilibrium exists that develops self-restoring forces as the side frames swing hangers rock transversely of the truck about the bearing connections 47, 48.

In Figs. 6 and 7 is shown a modified form of the invention. In Figs. 6 and 7 the bearing block 56 is mounted in the recess 45 in the bearing assembly casing 41 so that it is fixed against relative transverse and longitudinal movement with respect to the casing 41. Journal block 56 has an upwardly projecting male bearing portion 57 that is of substantially semi-cylindrical form with the axis of generation of the cylinder extending longitudinally of the truck side frame (see Fig. 6). The exterior surface of the bearing portion 57 engages a mating substantially semi-cylindrical, concavely arched, downwardly directed, female bearing surface 58 that is formed in the exposed underside of the upper wall of the side frame journal box housing 23. As was the case with the mating bearing surfaces 47 and 48 in Figs. 1–5, the radius of curvature of the bearing surface 58 is slightly larger than the radius of curvature of the exterior bearing surface of the bearing portion 57. This permits initial rocking motion between these surfaces thereby eliminating starting friction and provides for free swinging, self-restoring, pivotal action between the side frame 20 and the associated wheel-axle mounted journal bearing assemblies 21. As the amplitude of side frame pivotal movement increases, sliding finally takes place between the surfaces 57, 58 and friction develops that produces a damping effect on the pivotal movement of the side frames 20. To provide means to withstand longitudinal thrust between the side frames 20 and the wheel-axle journal bearing assemblies 21 in this form of the invention, it will be noted that the upper wall of the journal box housing 23 is recessed at 59 (see Fig. 6) to provide a seat to receive the bearing portion 57 of bearing block 56. With the bearing block 56 mounted in the recessed seats 45 and 59, it is obvious that there will be no relative longitudinal motion between the side frame 20, the bearing block 56 and the bearing assembly 21. Thus in this form of the invention there is provided longitudinal stability for the journal bearing assembly and also a bearing arrangement that can take longitudinal thrust while permitting the side frames to function as plank swing hangers with minimum frictional resistance to initial transverse rocking movement of the side frames.

In Figs. 8, 9 and 10 is shown another form of the invention wherein mating frustro-conically shaped bearing surfaces 61, 62 provide means for obtaining self-restoring pivotal movement of the side frames 20 on the axle supported journal bearing assemblies 21. This form of the invention provides a side frame bearing arrangement that will not only take longitudinal thrust without undue frictional resistance that might restrain the side frame self-restoring pivotal action, but in addition provides means whereby the longitudinal thrust is taken by the engaged, conical, friction ramp, bearing surfaces 61, 62 in a manner which prevents displacement of the bearing assembly casing 41 relative to the side frame housing 23. Such an arrangement provides the necessary longitudinal stability that is desired in a journal bearing assembly of the type herein disclosed and at the same time a more than adequate bearing area is provided to support the load and keep unit bearing pressures at a relatively low value to reduce wear and friction. In this form of the invention the exterior side of the upper wall of the bearing casing 41 is formed with recessed seats 63 that receive the spaced apart bearing blocks 64. The bearing blocks each have an upper, exposed, frustro-conically shaped, male bearing surface 61. The exposed lower side of the upper wall of the side frame journal box housing 23 is formed with a recessed seat 65 to receive a bearing insert 66. Insert 66 is formed with a pair of longitudinally spaced apart, frustro-conically shaped, female bearing surfaces 62. From Fig. 10 it will be noted that the mating bearing surfaces 61 and 62 have different radii of curvature in order to provide for an initial free rocking contact between these engaged bearing surfaces after which relative sliding may occur between the surfaces 61 and 62. The relative sliding at the opposite end portions of the side frame oscillation provides a damping action that is desirable in a pivotally supported bolster arrangement of the type herein disclosed. In this form of the invention the mating, frustro-conically shaped, bearing surfaces 61, 62 provide the desired self-restoring pivotal action between the side frame 20 and the bearing assemblies 21. In addition longitudinal thrust and bearing assembly stability, as well as side frame angular deflection are adequately controlled while unit bearing pressures are kept to a minimum.

In Figs. 11 and 12 is shown another modified form of the invention wherein the principles of this invention are applied to a more or less conventional wedge-engaged, shell-type, journal bearing assembly. The side frame 120 includes the journal box housing 123 that receives the journal box wedge 121 and the shell-type journal bearing 121'. Journal bearing 121' seats on the journal portion of the wheel-axle 122 and is connected to the housing 123 through the wedge 121 as hereinafter described. Side frame 120 is of the truss-type similar to that shown in Fig. 1 and has an upper compression member 124, a lower tension member 125 and spaced vertical columns 126 that connect the upper and lower members. The exposed side of the upper wall of lower tension member 125, between the columns 126, is provided with a depressed groove portion 125a. Groove 125a provides a female rocker bearing adapted to rockably receive a male rocker bearing 129a that projects downwardly from the underside of the plank member 129. The rocker bearing connection 125a, 129a provides the same type of plank member controlled pivotal action as, and is interchangeable with that described with regard to bearing elements 25a, 29a of the Figs. 1–10 forms of the invention. In the form of the invention shown in Figs. 11 and 12 the lower side of the shell-type bearing 121' seats upon and fits concentrically about the upper side of the journal portion of the wheel-axle 122 while the upper side of bearing 121' is designed to seat in a recess formed in the lower side of the journal bearing wedge 121. The upper side 121b of the standard wedge 121 is formed with transversely extending, upwardly directed, convex, bearing surface that will permit the side frame 120 to rock on or pivot about the axle 122. From Fig. 11 it is thought to be obvious that each side frame 120 may rock about a horizontally disposed axis that extends longitudinally of the truck at the level of the wedges 121. The exposed underside 123b of the upper wall of side frame journal box housing 123 is also transversely curved or arched about a horizontally disposed, longitudinally extending axis to provide a downwardly directed, convex, bearing surface that rockably engages the bearing surface 121b of the journal bearing wedge 121 so as to provide means for free transverse rocking of the side frames 120 about the axles 122.

A flexible dust guard 131 is movably mounted in the slot 139 in journal box housing 123 in such a manner that the side frame 120 may freely rock about the axle 122. Mounted within the lower portion of the journal box housing 123 and arranged to encircle the lower side of the axle journal portion is a perforated waste retaining plate 132. Waste retaining plate 132 is of substantially U-shaped cross-sectional configuration as clearly shown in Fig. 11. The upper side edges 132a of the waste retainer plate 132 are of arcuate shape to conform to the arcuate shape of the ribs 141 that extend transversely of and project from opposite sides of the interior wall of the side frame journal box housing 123. The radii of curvature r' of the housing ribs 141 and the retainer plate upper edges 132a are both swung from the center of contact 142 between the side frame journal box housing 123 and the wedge block 121 (see Fig. 11). With this arrangement transverse rocking of the side frame 120 on the axle supported wedge blocks 121 permits the retainer plate ribs 141 to swing concentrically about the upper edges 132a of the retainer plate 132 and the retainer plate 132 will not be deformed or the waste 133 disarranged during side frame rocking. The inner wall 123a of the lower side of the housing 123 is likewise curved about the center of curvature 142 as is the lower face or bottom wall 132b of the retainer plate. With the radii of curvature r" of these two concentrically arranged elements 123a and 132b substantially the same and swung from the same center it is obvious that there will be no interference during rocking of the side frame 120 on the axle journal supported wedge blocks 121. Bottom wall 132b of the retainer plate 132 is indented at 132c to insure sufficient clearance between the retainer plate 132 and the housing 123 at all times.

A hinged cover 123d on the housing 123 permits the waste 133 to be periodically inspected and re-saturated with lubricant. It is proposed to utilize cartridge type waste elements in the waste retainer plate 132 to improve the life, lubricating action and servicing of the axle journal lubricating means.

I claim:

1. In a railway truck comprising a pair of transversely spaced side frames mounted on a pair of longitudinally spaced wheel axles by means of journal bearing assemblies located on the upper sides of the axles, a plank member extending transversely between and pivotally connected to the spaced side frames by rocker bearing connections located below the level of the journal bearing assemblies, said journal bearing assemblies including matingly enaged surfaces of generation of slightly different radii of curvature pivotally mounting the side frames on the wheel axles such that the side frames may freely rock transversely of the truck so as to permit movement of the plank member transversely of the truck, said journal bearing assemblies providing friction ramp means that resist longitudinally directed thrust forces applied between the side frames and the wheel axles, and means that resist relative longitudinal displacement between the wheel axles and the side frames.

2. In a railway truck comprising a pair of transversely extending longitudinally spaced wheeled axles each having a journal portion adjacent each end thereof, a pair of longitudinally extending, transversely spaced, side frames having journal box housings adjacent each end, each housing receiving an axle journal portion, journal bearing assemblies mounted on the axle journal portions, each bearing assembly mounting a bearing portion having a convexly curved, upwardly projecting, bearing surface that extends at an angle to the horizontal to provide a ramp means, concavely curved, downwardly directed bearing means carried by each side frame journal box housing of greater radius of curvature than said convexly curved surface matingly and pivotally engageable with a bearing assembly mounted bearing portion and arranged such that the side frames may freely rock on the bearing assembly mounted bearing portions in a direction transversely of the truck, and a load supporting plank member extending transversely between and pivotally connected to the spaced side frames by rocker bearing connections.

3. In a railway truck as set forth in claim 2 wherein the bearing assembly mounted bearing portions comprise a pair of longitudinally spaced apart, opposed, frustro-conically shaped, surfaces that have their axes of generation extending longitudinally of the side frames and the side frame journal box housing mounted bearing means comprise a pair of longitudinally spaced apart, opposed, frustro-conically shaped, surfaces that matingly engage the bearing assembly mounted bearing portions.

4. In a railway truck comprising a pair of transversely extending longitudinally spaced wheeled axles each having a journal portion adjacent each end thereof, a pair of longitudinally extending, transversely spaced, side frames having journal box housings adjacent each end, each housing receiving an axle journal portion, journal bearing assemblies mounted on each axle journal portion, each bearing assembly mounting a bearing portion having a convexly curved, upwardly projecting spheroidally shaped bearing surface, concavely curved, downwardly opening, spheroidally shaped bearing means of greater radius of curvature than said concavely curved surface carried by each side frame journal box housing matingly and pivotally engageable with a bearing assembly mounted bearing portion and arranged such that the side frames may freely rock on the bearing assembly mounted bearing portions in a direction transversely of the truck, and a load supporting plank member extending transversely between and pivotally connected to the spaced side frames at a level below the bearing assembly bearing portions.

5. In a railway truck having the side frames mounted on the wheel axle journal portions for transverse rocking movement, journal box housings adjacent each end of the side frames adapted to receive an axle journal portion and provided with side frame mounted bearing means, journal bearing assemblies mounted on the axle journal portions having frusto-conically shaped bearing portions rockingly engageable with the side frame mounted bearing means wherein the journal bearing assembly mounted bearing portions are surface areas of curved configuration and the side frame journal box housing mounted bearing means are surface areas of curved configuration that matingly engages the bearing assembly mounted bearing portions, the radii of curvature of the said bearing means being slightly larger than the corresponding radii of curvature of the said frusto-conically shaped bearing portions.

6. In a railway truck having the side frames mounted on the wheel axle journal portions for transverse rocking movement, journal box housings adjacent each end of the side frames adapted to receive an axle journal portion and provided with side frame mounted bearing means, journal bearing assemblies mounted on the axle journal portions having bearing portions rockingly engageable with the side frame mounted bearing means wherin the journal bearing assembly mounted bearing portions are of substantially spheroidal configuration and the side frame journal box housing mounted bearing means are of a substantially spheroidal configuration that matingly engages the bearing assembly mounted bearing portions, the said spheroidal bearing means having radii of curvature slightly larger than the radii of curvature of the said spheroidal bearing portions.

7. In a railway truck having the side frames mounted on the wheel axle journal portions for transverse rocking movement, journal box housings adjacent each end of the side frames adapted to receive an axle journal portion and provided with side frame mounted bearing means, journal bearing assemblies mounted on the axle journal portions having bearing portions rockingly engageable with the side frame mounted bearing means wherein bearing assembly mounted bearing portions comprise a pair of longitudinally spaced apart, opposed, frustro-conically shaped, surfaces that have their axes of generation extending longitudinally of the side frames and the side frame journal box housing mounted bearing means comprise a pair of longitudinally spaced apart, opposed, frustro-conically shaped surfaces that matingly engage the bearing assembly mounted bearing portions, the radii of curvature of the frustro-conically shaped bearing mounted bearing portions being less than the corresponding radii of curvature of the frustro-conically shaped side frame housing mounted bearing means.

8. In a railway truck comprising a pair of transversely spaced side frames mounted on a pair of longitudinally spaced wheeled axles by means of journal bearing assemblies one of which is mounted on the upper side of each end of each axle, said journal bearing assemblies including convexly curved bearing portions engageable with mating concavely curved bearing portions mounted on the side frames, said concavely curved portions being of greater radius of curvature than the convexly curved portions so as to pivotally mount the side frames on the wheel axles such that the side frames may freely swing transversely of the truck, the said journal bearing assemblies providing ramp means that resist movement of the side frames transversely of the axles due to longitudinally directed thrust forces applied between the side frames and the wheeled axles.

9. In a railway truck comprising a pair of transversely spaced side frames mounted on a pair of longitudinally spaced wheeled axles by means of journal bearing assemblies mounted on the upper side of each end of each axle, the bearing assemblies supporting the side frames being such that the side frames are permitted to pivot on the axles about horizontally disposed, longitudinally extending, axes, said journal bearing assemblies including spheroidally formed convexly curved bearing portions matingly engaged with spherodially formed concavely curved bearing portions of slightly greater radius of curvature that are carried by the overlying portions of the side frames, the said spherodially formed, matingly engaged, bearing portions providing ramp means that resists longitudinally directed thrust forces applied between the side frames and the wheel axles without providing sufficient frictional resistance to interfere with transverse pivotal movement of the side frames on the axles.

10. In a railway truck comprising a pair of transversely spaced side frames mounted on a pair of longitudinally spaced wheel axles by means of journal bearing assemblies carried on the upper sides of the axles, a plank member extending transversely between and pivotally connected to the spaced side frames by rocker bearing connections located below the level of the journal bearing assemblies, said journal bearing assemblies including convexly curved surfaces of generation matingly engaged with side frame mounted concavely curved surfaces of generation of slightly greater radius of curvature that pivotally mount the side frames on the wheel axles such that the side frames may freely rock transversely of the truck, said journal bearing assemblies providing friction ramp means that resist longitudinally directed thrust forces applied between the side frames and the wheel axles and control transverse rocking of the side frames on the axles.

11. In a railway truck comprising a pair of transversely extending longitudinally spaced wheeled axles each having a journal portion adjacent each end thereof, a pair of longitudinally extending, transversely spaced, side frames having journal box housings adjacent each end, each housing receiving an axle journal portion, journal bearing assemblies mounted on the axle journal portions, each bearing assembly mounting a bearing portion having a convexly curved, upwardly projecting, substantially hemi-spheroidal bearing surface, concavely curved, downwardly directed substantially hemi-spheroidal bearing means carried by each side frame journal box housing, of greater radius of curvature than said convexly curved bearing surface, matingly and pivotally engageable with a bearing assembly mounted bearing portion and arranged such that the side frames may freely rock on the bearing assembly mounted bearing portions in a direction transversely of the truck, and a load supporting plank member extending transversely between and pivotally connected to the spaced side frames by rocker bearing connections.

12. In a railway truck comprising a pair of transversely extending longitudinally spaced wheeled axles each having a journal portion adjacent each end thereof, a pair of longitudinally extending, transversely spaced, side frames having journal box housings adjacent each end, each housing receiving an axle journal portion, journal bearing assemblies mounted on the axle journal portions, each bearing assembly mounting a bearing portion having a convexly curved, upwardly projecting, substantially hemi-ellipsoidal bearing surface, concavely curved, downwardly directed substantially hemi-ellipsoidal bearing means carried by each side frame journal box housing, of greater radius of curvature than said convexly curved bearing surface, matingly and pivotally engageable with a bearing assembly mounted bearing portion and arranged such that the side frames may freely rock on the bearing assembly mounted bearing portions in a direction transversely of the truck, and a load supporting plank member extending transversely between and pivotally connected to the spaced side frames by rocker bearing connections.

References Cited in the file of this patent

UNITED STATES PATENTS

| | | |
|---|---|---|
| 895,157 | Bush | Aug. 1, 1908 |
| 2,074,891 | Dean | Mar. 23, 1937 |
| 2,148,942 | Hallquist | Feb. 28, 1939 |
| 2,418,398 | Cottrell | Apr. 1, 1947 |